UNITED STATES PATENT OFFICE.

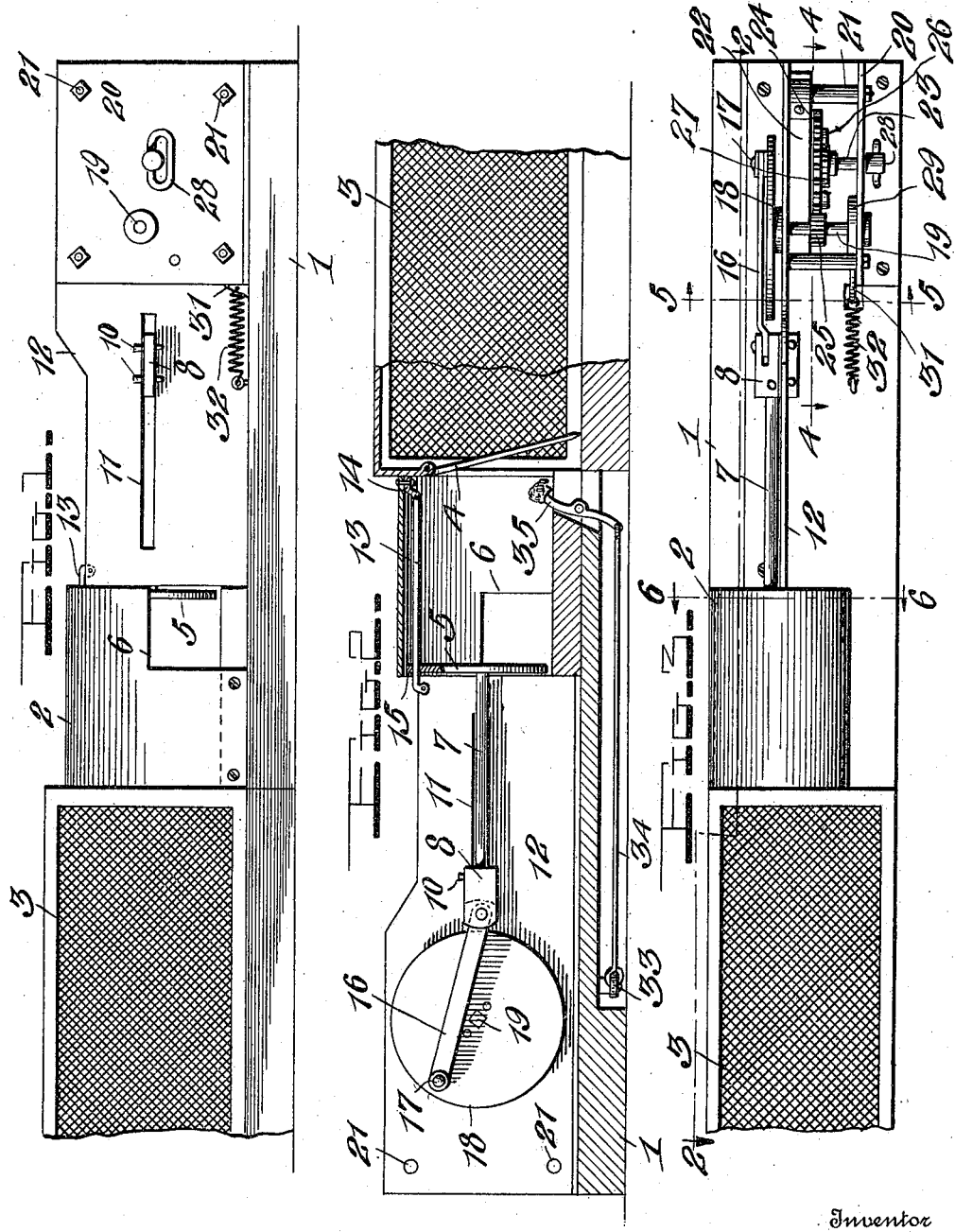

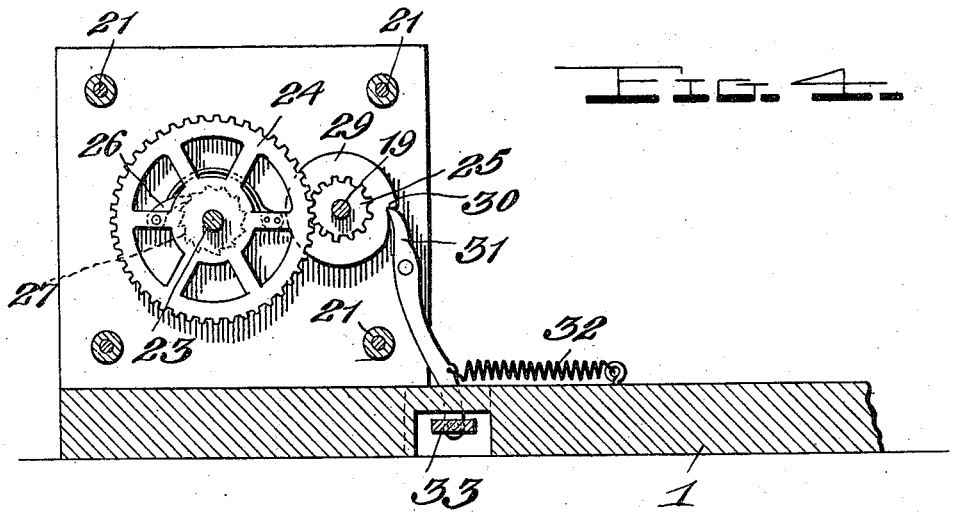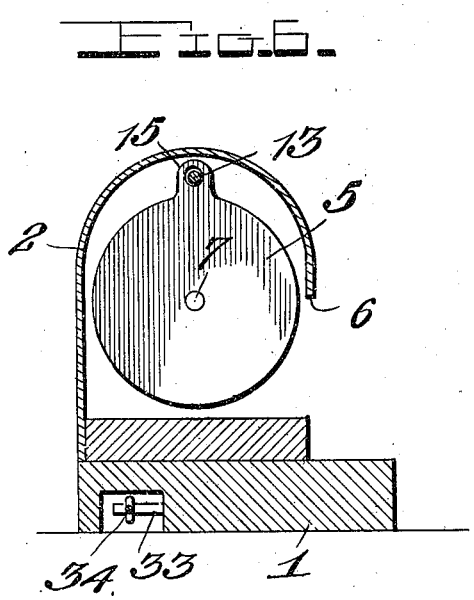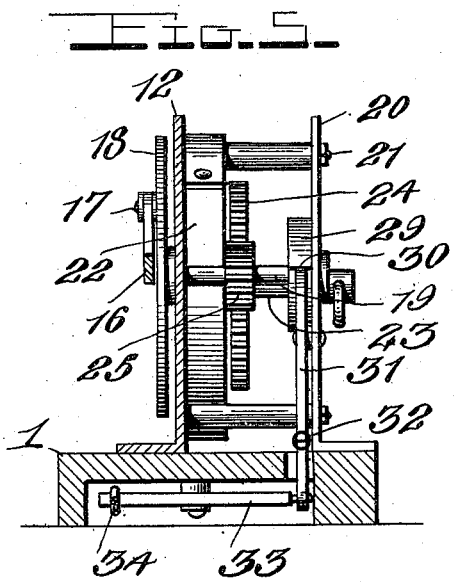

THEODORE HARDEGEN, OF LONACONING, MARYLAND.

TRAP.

982,001. Specification of Letters Patent. Patented Jan. 17, 1911.

Application filed April 23, 1910. Serial No. 557,126.

*To all whom it may concern:*

Be it known that I, THEODORE HARDEGEN, a citizen of the United States, residing at Lonaconing, in the county of Allegany and State of Maryland, have invented certain new and useful Improvements in Traps, of which the following is a specification, reference being had to the accompanying drawings.

This invention relates to improvements in animal traps and more particularly to means for forcing the animal into a trap body or cage when the animal actuates a bait holder.

The object of the invention is to provide a simple and practical device of this character which may be used in connection with various kind of cages, which will be automatic in operation and self-setting so that after one animal has been forced into the cage the parts will be reset, and which will be simple in construction, strong and durable and comparatively inexpensive.

With the above and other objects in view, the invention consists of the novel features of construction and the combination and arrangement of parts hereinafter fully described and claimed, and illustrated in the accompanying drawings, in which:—

Figure 1 is a side elevation of my improved animal trap; Fig. 2 is a longitudinal section on line 2—2 in Fig. 3; Fig. 3 is a top plan view; and Figs. 4, 5 and 6, are detail sectional views taken respectively on the planes indicated by the lines 4—4, 5—5 and 6—6 in Fig. 3.

Referring more particularly to the drawings 1 denotes a base member and 2 denotes a covered passageway arranged thereon and leading to the entrance of a trap body or cage 3. The latter may be mounted on the base 1 and form a part of the same if desired, but as illustrated it is independent of the base and the passageway 2 is mounted at one end of the base so that the device may be used in connection with any kind of cage or trap having a trap door. The cage 3 is preferably provided with an inwardly swinging trap door 4 which drops by gravity to its closed position as the animal passes under it so as to prevent the exit of the animal.

Mounted to reciprocate in the passageway 2 is a plunger 5 which is adapted to force an animal in said passageway through the same and into the trap. This plunger is here shown as in the form of a circular head and is adapted to reciprocate from the inner to the outer end of the passageway, it being disposed at the inner end of the passageway when in its normal retracted position, as shown in the drawings. To permit an animal to enter the passageway in advance of the plunger, a small opening 6 is formed in one of the side walls of the passageway, which latter is preferably of semicircular shape in cross section. The plunger 5 is fixed to one end of a rod 7 which projects from a cross head 8 mounted for sliding movement as shown at 10, in a longitudinal slot 11 formed in an upright plate 12 which rises from the base 1 and extends longitudinally thereof.

To steady the plunger in its reciprocatory movement, a guide 13 is provided in the top of the passageway 2 and is in the form of a rod having one of its ends offset and secured at 14 in the outer end of the passageway, while its other end may be secured to the plate 12. The guide rod 13 passes through an apertured lug 15 on the top of the plunger so that the latter will be supported and guided in its reciprocatory movement. The cross head 8 is connected by a pitman 16 to a wrist-pin 17 on a crank disk 18 fixed to one end of a transverse shaft 19 journaled in the plate 12, and in a similar but shorter upright plate 20 which rises from the base 1. The two plates 12, 20 are united by connecting and spacing bolts 21 and form a casing for a coil spring 22, the outer end of which is fixed to one of the bolts 21 and the inner end of which is fixed to a transverse shaft 23. The latter has loosely mounted upon it a gear 24 which meshes with the pinion 25 on the shaft 19, and said gear carries a spring pressed, pivotally mounted pawl 26 which meshes with a ratchet wheel 27 fixed to the shaft 23. This pawl and ratchet connection for the gear allows the spring to be rewound by rotating a finger piece or handle 28 on one end of the shaft 23.

Fixed to the inner portion of the shaft 19 is a circular plate or disk 29 formed in its edge with a notch or seat 30 to receive a dog or pawl 31 which is pivotally mounted intermediate its ends on the inner face of the plate 20. The dog is actuated toward the notched disk by a coil spring 32 connected to its long depending end, which latter also extends through a vertical opening or slot in the base 1 and is loosely connected to one end of a transverse lever 33 fulcrumed intermediate its ends in a recess in the base. The other end of the lever 33 is connected by a link 34 to the lower end of a bait-holding lever or trigger 35, which latter is arranged for swinging movement in a vertical slot or opening forward in the base at or adjacent to its outer end and within the passageway 2.

The upper end of the bait trigger is hook-shaped to receive a piece of bait and when pulled rearwardly will disengage the dog from the notched disk on the shaft 19, thereby releasing said shaft and allowing the spring to cause it to make a single revolution, the dog 31 being actuated by the spring 32 to again engage the notch in said disk and thereby stop the shaft 19. When said shaft makes its revolution the pitman 16 will actuate the plunger 5 in an outward direction to force the animal into the trap and then in an inward or rearward direction to retract the plunger to its normal position. It will thus be seen that each time the trigger is actuated the plunger will be reciprocated and the device will reset itself ready for the next operation.

From the foregoing description taken in connection with the accompanying drawings, it is thought that the construction, operation and advantages of the invention will be readily understood without a more extended explanation.

Various changes in the form, proportion and arrangement of parts may be made within the spirit and scope of the invention.

Having thus described the invention, what is claimed is:

1. A trap of the class described comprising a base, a cage thereon, a passageway leading to the cage, and having an entrance opening in one side, a trap door to close against exit from the cage through the passageway, a plunger movable longitudinally in the passageway, a motor to communicate reciprocating motion to the plunger, and having a revoluble element provided with a stop, a dog, a spring to normally engage said dog with said stop, a trigger in one side of the passageway, and a rod connecting the trigger directly to the dog.

2. The combination of a base, a covered passageway arranged longitudinally at one end of the base and having an open outer end and an inlet adjacent its inner end, an upright plate arranged longitudinally on the base and extending from the inner end of the passage way, a longitudinally movable slide on said plate and carrying a rod, a plunger head fixed to said rod and arranged for longitudinal movement in the passageway, a guide rod arranged in the upper portion of the passageway and having one end fixed to said plate and its other end to the top of the passageway, said plunger head being apertured to receive said guide rod, a rotary shaft having a crank pin, a link connecting said pin to said slide, a rotatable disk actuated from said shaft, and having a notched periphery, a spring pressed dog coacting with the notched periphery of said disk, and a trigger arranged in the passageway adjacent its open outer end and operatively connected to said dog.

In testimony whereof I hereunto affix my signature in the presence of two witnesses.

THEODORE HARDEGEN.

Witnesses:
CHARLES BONNER HARDEGEN,
JNO. THEODORE HARDEGEN.